(No Model.)
A. W. HOWARD.
OVEN.
No. 416,839. Patented Dec. 10, 1889.
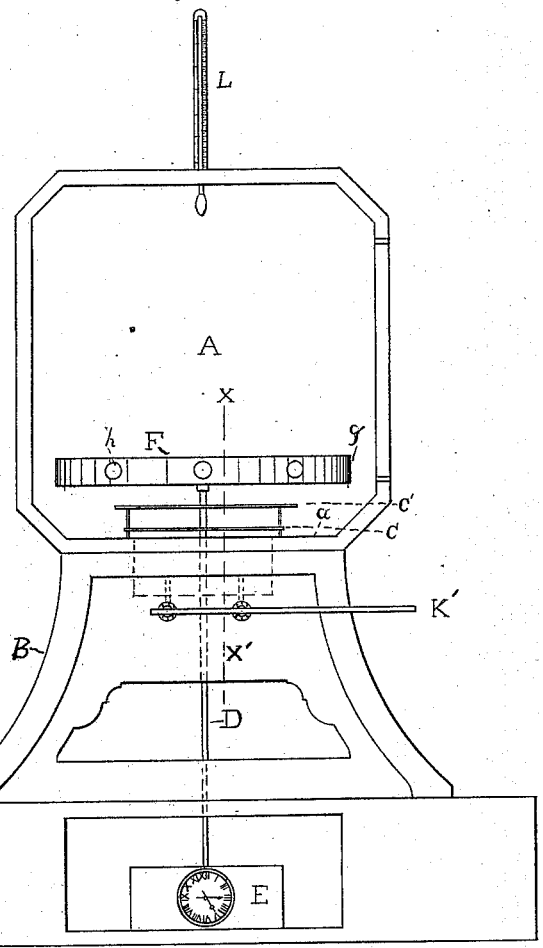
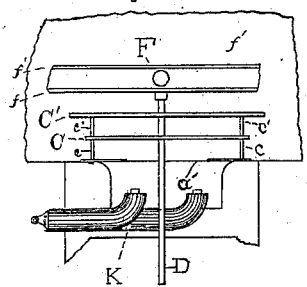
WITNESSES:
Thomas Peebles
Emma F. Elmore
INVENTOR
Albert W. Howard
BY
Jas. F. Williamson
ATTORNEY
N. PETERS, Photo-Lithographer, Washington, D. C.

UNITED STATES PATENT OFFICE.

ALBERT W. HOWARD, OF MINNEAPOLIS, MINNESOTA.

OVEN.

SPECIFICATION forming part of Letters Patent No. 416,839, dated December 10, 1889.

Application filed September 27, 1887. Renewed October 28, 1889. Serial No. 328,372. (No model.)

*To all whom it may concern:*

Be it known that I, ALBERT W. HOWARD, a citizen of the United States, and a resident of the city of Minneapolis, county of Hennepin, State of Minnesota, have invented a certain new and useful Improvement in Ovens, of which the following is a specification, reference being had to the accompanying drawings.

My invention relates to baking-ovens, and was especially designed to meet the necessities of the particular business of testing flour. For this purpose it is essential to submit every batch of baking to exactly similar conditions. Under these circumstances the same grade and quality of flour ought in every instance to turn out the same quality of bread. A record is kept of the daily results, and in this way the merchant-mills always know exactly what kind of bread any particular run of flour will produce.

By my improved oven I secure a uniform temperature and a like distribution of the same on all parts of the dough.

My invention consists in the construction shown in the drawings and hereinafter described, and particularly pointed out in the claims.

Figure 1 is a front elevation of my improved oven with the door of the same removed, and Fig. 2 is a section of a part of the oven on the line X X' of Fig. 1.

A is the body of the oven proper, and B is the spider-like pedestal or support for the same. The bottom $a$ of the oven is cut away in the center, as shown at $a'$. Over this annular central opening is placed an annular deflector C near the floor of the oven, but a slight distance above the same, resting upon the legs $c$, and over the deflector C is placed a similar but larger solid circular deflector C', supported by the continuation $c'$ of the legs $c$. These deflectors both lie in horizontal planes and are placed about an inch apart. Each deflector is perforated in the center to allow the passage of a vertical driving-shaft D, which is made to revolve by clock mechanism, as shown at E. The shaft D projects about an inch above the deflector C', and has rigidly attached thereto the hollow pan-carrying disk or drum F, which is composed of the lower and upper imperforate heads $f f'$ and the perforated periphery or vertical walls $g$. This pan-carrying drum is preferably of about two inches in depth and is of such a diameter as to freely revolve within the oven A. It is of importance to have the periphery of the drum perforated, as shown at $h$, in order to secure a circulation of air through the same. Under the deflectors, in the space $a'$, I apply the heat, preferably using for the purpose what is known to the trade as the "Economy Gas-Furnace." The burners are shown at K and the gas-supply pipe at K' in the drawings.

In order to indicate the temperature of the oven, I provide the thermometer L, having its mercury-bulb within the oven and its stem projecting through a perforation in the top plate of the same.

Instead of by the clock E, the shaft D and its attached pan-carrying drum F may be revolved by any other suitable mechanism connected with a source of motion; but, as very little power is required, a clock answers the purpose very well.

The operation of my improved oven is as follows: The gas being lighted, the heat is applied directly to the metallic deflector C, and is in part turned to the right and to the left and in part conducted directly into the space between C and C'. By the larger disk or deflector C' the conducted heat is again directed in part to the sides of the oven and in part through the disk to the lower head $f$ of the pan-carrying drum. This pan-drum being in motion, the currents of hot air will pass equally over all surfaces of the same through the perforations in its periphery, heating it to a like temperature throughout. The bread is thus baked by indirectly-applied heat. The flame is nowhere applied directly to the bread-carrying drum. It is therefore never burned in spots. In virtue of its movement a constant circulation of the hot air is maintained. The heat is thus kept uniform and is equally distributed. The loaf of bread is baked equally throughout, and with similar grades of flour the loaves from successive bakings cannot be distinguished by the eye.

What I claim, and desire to secure by Letters Patent of the United States, is as follows:

1. The combination, with a baking-oven having a central opening in its bottom for the application of heat, of one or more deflectors suitably supported directly above said opening and a revolving pan-carrier pivotally supported above said deflectors and revolving in the horizontal plane, substantially as described.

2. The combination, with a baking-oven having a central opening in its bottom for the application of heat, of one or more deflectors suitably supported directly above said opening and a revolving pan-carrier consisting of a disk-shaped vertical drum having imperforate ends and a perforated periphery pivotally supported above said deflector and revolving in the horizontal plane, substantially as described.

3. The combination, with the baking-oven A, having a central opening $a'$ in its bottom plate for the application of heat, of the revolving vertical shaft D, mounted in suitable bearings and projecting through said opening into the interior of said oven, the annular deflector C, encircling said shaft and supported directly above said opening, the solid deflector C′, encircling said shaft and supported above said deflector C, and the disk-shaped pan-carrying drum F, consisting of the imperforate ends $f\,f'$, connected by the perforated peripheral wall $g$, rigidly attached to the top of said shaft above said deflector C′, substantially as and for the purpose set forth.

4. The combination, with a baking-oven having a central opening in its bottom plate for the direct application of heat from a burner or other heating device, of a revolving pan-carrying drum pivotally supported above said opening and revolving in the horizontal plane, substantially as described.

5. In baking-ovens, a revolving pan-carrying drum adapted to carry the loaf-pan on one end, and consisting of imperforate end disks connected by a perforated peripheral wall pivotally supported within the oven and revolving in the horizontal plane, substantially as described.

ALBERT W. HOWARD.

In presence of—
J. F. WILLIAMSON,
EMMA F. ELMORE.